US010580152B2

(12) United States Patent
Slettemoen

(10) Patent No.: US 10,580,152 B2
(45) Date of Patent: Mar. 3, 2020

(54) FREE SPACE POSITION FINDER

(71) Applicant: Lumincode AS, Klaebu (NO)

(72) Inventor: Gudmund Slettemoen, Klaebu (NO)

(73) Assignee: LUMINCODE AS, Klaebu (NO)

(*) Notice: Subject to any disclaimer, the term of this patent is extended or adjusted under 35 U.S.C. 154(b) by 0 days.

(21) Appl. No.: 15/578,930

(22) PCT Filed: Jun. 4, 2015

(86) PCT No.: PCT/NO2015/050102
§ 371 (c)(1),
(2) Date: Dec. 1, 2017

(87) PCT Pub. No.: WO2016/195502
PCT Pub. Date: Dec. 8, 2016

(65) Prior Publication Data
US 2018/0174317 A1 Jun. 21, 2018

(51) Int. Cl.
*G06T 7/521* (2017.01)
*G01B 11/00* (2006.01)
(Continued)

(52) U.S. Cl.
CPC ............ *G06T 7/521* (2017.01); *G01B 11/002* (2013.01); *G01B 11/26* (2013.01); *G01B 21/042* (2013.01);
(Continued)

(58) Field of Classification Search
CPC ........ G06T 7/521; B23Q 37/00; G01B 11/002
See application file for complete search history.

(56) References Cited

U.S. PATENT DOCUMENTS 4,967,093 A * 10/1990 Takemori ............. G01B 11/162
250/559.2
5,753,931 A * 5/1998 Borchers ................ A43D 1/025
250/559.05
(Continued)

FOREIGN PATENT DOCUMENTS

CN 1256755 A 6/2000
CN 1426527 A 6/2003
(Continued)

OTHER PUBLICATIONS

Yamaguchi et al., *Laser speckle rotary endcoder*, 28(20) Applied Optics 4401-4406 (Oct. 15, 1989).
(Continued)

*Primary Examiner* — Jamie J Atala
*Assistant Examiner* — Michael Robert Cammarata
(74) *Attorney, Agent, or Firm* — Buchanan Ingersoll & Rooney PC

(57) ABSTRACT

Deriving data for calibration or improving the positioning of a computer-controlled machine involves a movable carrier for changing the position of a first machine part relative that of second machine part. The carrier is moved to a plurality of carrier positions. At each position, a pattern generator attached to the first machine part is illuminated such that at least one three-dimensional pattern of light is created in space. Position data is recorded and images of the three-dimensional pattern are recorded in at least two different optical configurations of the illuminator, the pattern generator, and at least one camera. The recorded image data is compared with image data of a reference database, and pairs of similar images are found. Image translation off set data is derived for each pair, and translation and rotation data are derived.

4 Claims, 9 Drawing Sheets

(51) Int. Cl.
  *G01B 21/04* (2006.01)
  *G01D 5/26* (2006.01)
  *G01B 11/26* (2006.01)
  *G05D 3/12* (2006.01)
  *H04N 5/225* (2006.01)
  *G01D 18/00* (2006.01)

(52) U.S. Cl.
  CPC ............... *G01D 5/26* (2013.01); *G01D 18/00* (2013.01); *G05D 3/12* (2013.01); *H04N 5/2256* (2013.01)

(56) References Cited

U.S. PATENT DOCUMENTS

| | | | |
|---|---|---|---|
| 6,246,482 B1 | 6/2001 | Kinrot et al. | |
| 6,642,506 B1* | 11/2003 | Nahum | G01B 3/205 250/231.13 |
| 6,664,531 B2* | 12/2003 | Gartner | G01B 11/245 250/208.1 |
| 2003/0042401 A1 | 3/2003 | Gartner et al. | |
| 2004/0179204 A1 | 9/2004 | Hizuka et al. | |
| 2005/0156100 A1 | 7/2005 | Xie et al. | |
| 2010/0310284 A1* | 12/2010 | Funato | G01P 3/68 399/302 |
| 2011/0240169 A1* | 10/2011 | Leibfritz | B21C 51/00 140/140 |
| 2013/0235389 A1 | 9/2013 | Hwang et al. | |
| 2013/0250278 A1* | 9/2013 | Zhao | G01B 11/162 356/35.5 |
| 2014/0307264 A1* | 10/2014 | Luthi | G01C 15/002 356/498 |
| 2015/0085080 A1 | 3/2015 | Hollenbeck et al. | |
| 2015/0182136 A1* | 7/2015 | Durduran | G01B 9/02094 600/425 |
| 2016/0077515 A1* | 3/2016 | Pfeffer | B23Q 3/155 700/160 |
| 2018/0315207 A1* | 11/2018 | Quaedackers | G06T 7/521 |
| 2018/0332310 A1* | 11/2018 | Huang | H04N 19/503 |

FOREIGN PATENT DOCUMENTS

| | | |
|---|---|---|
| CN | 1910647 A | 2/2007 |
| EP | 1 924 400 | 5/2008 |
| JP | H05-215532 A | 8/1993 |
| JP | H09-178475 | 7/1997 |
| JP | 2004-271381 | 9/2004 |
| JP | 2014-232041 | 12/2014 |
| WO | WO 01/81859 | 11/2001 |
| WO | WO 2007/032681 A1 | 3/2007 |
| WO | WO 2013/156530 | 10/2013 |
| WO | WO-2013156530 A1 * | 10/2013 ............. G01B 11/25 |

OTHER PUBLICATIONS

Yamaguch et al., *Laser Speckle Rotary Endcoder*, 28(20) Applied Optics 4401-4406 (Oct. 15, 1989) (abstract only).

International Search Report for corresponding PCT Application No. PCT/NO2015/050102, dated Mar. 31, 2016.

Office Action dated Mar. 26, 2019 by the Japanese Patent Office in corresponding Japanese Patent Application No. 2017-563244 and an English translation of the Office Action. (16 pages).

English Translation of the Notification of the First Office Action dated Jul. 25, 2019 by the National Intellectual Property Administration of the People's Republic of China in corresponding Chinese Patent Application No. 201580080659. (9 pages).

* cited by examiner

FREE SPACE POSITION FINDER

CROSS-REFERENCE TO RELATED APPLICATIONS

This application is a U.S. National Phase Application pursuant to 35 U.S.C. § 371 of and claims priority to International Patent Application No. PCT/NO2015/050102, filed on Jun. 4, 2015, and published as WO 2016/195502 on Dec. 8, 2016, which is incorporated herein by reference in its entirety for all purposes.

BACKGROUND OF THE INVENTION/DESCRIPTION OF RELATED ART

The present invention relates to the field of devices and methods for finding exact translations and rotations within computer controlled machines such as machine tools, opto-mechanical measuring devices, coordinates measuring machines (CMM), robots, and as position encoders. More specifically the invention relates to the rigid body translation and rotation calibration at a plurality of machine part positions, or simultaneous translation and rotation reading within such devices.

Referring to XYZ coordinate axes, by the translation of a part is in the following meant the X,Y,Z coordinate of a specific location on that part. By the rotation of the same part is meant the Rx,Ry,Rz rotation angles of that part, where Rx, Ry, and Rz refer to rotation angles around the given X, Y, and Z axes, respectively. By the position of a part is in the wider sense meant either the combined translation and rotation, the translation, or the rotation of a part. Typically the above mentioned machines use translation reading devices, so called encoders, to read the exact translation of different parts of the machine. If, for example, such a machine is built with three translation degrees of freedom, XYZ, and one rotation angle degree of freedom, θ, linear encoders are placed at each of three respective X, Y and Z-carriers, and an angular encoder is placed at a rotation axis of a θ carrier of the machine. However, these encoders are usually located at a distance from the work area (or work space) of the machine; otherwise the encoders would come in conflict with the work area operations of the machine. As a consequence, in order to determine the translation of a specific machine part or tool in said workspace, translations and rotations of several machine parts need to be determined from measurements made by the respective encoders. By using geometrical information and performing geometrical calculations based on said measurements, the translation and rotation of said specific machine part, or typically the translation and rotation of a tool located in the work space of the machine, is derived. However, mechanical irregularities, clearance, and/or mechanical play, affect machine part movements. Thus, translation and rotation offsets between the encoder reading positions and the work area operation positions, introduce hard-to-measure offsets associated with each respective degree of freedom, whose offsets are not accounted for in said geometrical calculations, and which in its turn leads to a certain degree of uncertainty and error of the determined machine part positions.

In order to measure and calibrate the 3D (three dimensional) positioning of e.g. machine tools, opto-mechanical devices, and encoders, so called touch probes are typically used. A touch probe can be mounted into the machine tool tool-holder and, for measurement purposes, be moved to touch the calibrated position of gauges like steel balls or bars. This is a time consuming point by point process and requires that expensive dimension calibrated gauges are mounted and used.

Typically an encoder measures the 1D (one dimensional) translations along a bar or, to read a rotation angle, the 1D rotation on a periphery of a rotating shaft. It may be complicated and expensive to expand the same processes to simultaneously read both translations and rotations for some, or all of the 6 (3 translations+3 rotations) possible mechanical degrees of freedom of a rigid body. Present day encoders may, due to accuracy limitations, not be very suitable for reading the difference between e.g. the translations along two bars and possibly extrapolate those difference translations into values for translations for locations reaching far outside the bars.

In the literature, such as Christopher J. Dainty ed. in Laser Speckle and Related Phenomena, Springer Verlag, Berlin 1974, a range of so called speckle photography and speckle interferometry techniques are described. The main focus of those techniques is on the measurement of object-internal deformations and surface topography. The speckle photography techniques are not able to measure both local translation and rotation angle offsets at a plurality of part positions in the 3D space. Correspondingly, and in addition, interferometric techniques are vibration sensitive, and in many cases not well suited for industrial applications.

Later on, e.g. Ichirou Yamaguchi et. al. in Applied Optics, Vol. 28, No. 20, Oct. 15, 1989 and Vijay Shilpiekandula in his Master thesis, Massachusetts Institute of Technology, February 2004, describe how a defocused or focused camera can be used to make a rotation angle reading encoder by recording the speckle displacement by use of eq. a camera. This technique also lacks the ability to measure both local translation and rotation offsets at a plurality part positions in the 3D space.

The European patent EP1924400, describes an apparatus and method for finding part position relations of parts of mechanical and opto-mechanical machining and quality control systems, and for recognizing these parts. This technique describes, amongst others, correlation techniques to find image displacement of focused surface structure. But this technique lacks the ability to measure both translation and rotation offsets at a plurality of part positions in the 3D space.

Thus, known mechanical and optical devices and methods, for finding translation and rotations within computer controlled machines, lack sufficient measurement ability or are too sensitive or error-prone. Further they typically require time-consuming and/or expensive calibration.

OBJECTIVES OF THE INVENTION

An objective of the invention is to improve accuracy in determination of either part translation or rotation, or both part translation and rotation, within the work space of computer controlled machines. Another objective of the invention is to reduce time needed for calibration of computer controlled machines. Yet another objective of the invention is to provide translation and/or rotation correction data to the computer control of machines, or provide solutions that directly work as advanced translation and/or rotation encoders.

SUMMARY

These and other objectives and advantages, which will be understood from the following description of the present invention, are achieved by the device, system and methods according to the appended independent claims. Other aspects of the invention are defined by the appended dependent claims.

According to an aspect of the invention, a sensor device suitable for use in a computer-controlled machine having a movable carrier for changing the position of a first machine part relative to a second machine part located in the work space of the said computer-controlled machine, comprises a pattern generator attachable to the first machine part, at least one illuminator configured to illuminate the pattern generator for jointly creating a combined three-dimensional light diffraction and interference pattern in said work space, hereinafter referred to as a light pattern or as a pattern of light, and at least one camera attachable to the second machine part. The camera is advantageously configured to record pattern images of said three-dimensional pattern of light in the work space. In an embodiment, the sensor device further comprises storage means for receiving image data from said at least one camera and position data of said carrier, and is configured to record images in at least a first and second different optical configuration of said at least one illuminator, said at least one camera and said pattern generator. The effective distance, which is the inverse of the harmonic sum of the illumination divergence center distance from the pattern generator, the camera object plane distance from the pattern generator, and the effective pattern generator focal length, of the first optical configuration differs from the effective distance of the second optical configuration. According to an aspect of the invention, the at least one illuminator is configured to illuminate the pattern generator with at least partially coherent light. The higher the degree of coherence of the light is, the wider the three-dimensional light pattern extends in space.

A system according to an aspect of the invention comprises a sensor device according to any one of the aspects above, and a storage means carrying a reference database. The reference database comprises interrelated image and carrier position data representing the exact translation and rotation of a reference machine part relative to the pattern generator. The provision of the reference database makes it possible to associate the image samples recorded in a first computer-controlled machine to image samples previously, or later, recorded in a second computer-controlled machine. The second machine is a reference machine that uses the same optical configurations as the first machine.

According to an aspect, the system further comprises a processing means configured to compare said recorded image data with image data of the reference database and find pairs of similar images, to derive image translation offset data for each pair of similar images, and to derive data for calibration of the computer-controlled machine based on image translation offset data associated with a plurality of different optical configurations. The processing means enables the system to automatically compare the images and derive data for calibration of the computer-controlled machine.

Another aspect describes a method of recording data associated with the relative translation and rotation of a first and a second part of a computer-controlled machine. The computer-controlled machine comprises movable carriers for changing the position of the first machine part relative to the second machine part. The method comprises the steps of moving the carriers to a plurality of positions. At each position at least one illuminator is used to illuminate a pattern generator attached to the first machine part such that at least one three-dimensional light pattern is created in space. Also at each position, images of said at least one three-dimensional light pattern is recorded in at least two different optical configurations of said pattern generator, said at least one illuminator, and at least one camera. Such a method enables quick and accurate sampling of data associated with the translation and rotation of the first machine part relative to the translation and rotation of the second machine part. Thus, the method enables dense sampling of translation and rotation offsets in a computer-controlled machine, such as a machine tool or a coordinate measuring machine.

According to an aspect the method comprises the further method step of at each position recording the position of said carriers.

According to an aspect, at each position a plurality of said illuminators are controlled to alternately illuminate the pattern generator.

According to an aspect, images recorded at each position are recorded using a plurality of cameras configured to record images in different object planes.

According to an aspect, a method of deriving data for calibration of a computer-controlled machine is provided. The computer-controlled machine comprises a movable carrier for changing the position of a first machine part relative to a second machine part. This method comprises the steps of moving the carrier to a plurality of carrier positions, such that the position of the first machine part relative to the second machine part changes for each position. At each carrier position at least one illuminator is operated for illuminating a pattern generator attached to the first machine part such that at least one three-dimensional light pattern is created in space. Also at each carrier position, position data related to the position of said carrier is also recorded. Further at each carrier position, images of said at least one three-dimensional light pattern created in space is recorded in at least two different optical configurations of said at least one illuminator, said pattern generator and at least one camera. For each respective carrier position, pairs of similar images are found by comparing said recorded image data and image data of a reference database, the said image data of a reference database comprising interrelated image and position data that are associated with the unique light pattern in space that is reflected or transmitted from the pattern generator. The similar images are analysed to derive image translation offset data for each pair of similar images. Furthermore, data for calibration of the computer-controlled machine is derived based on image translation offset data associated with a plurality of different optical configurations.

According to an aspect the pattern generator is illuminated with at least partially coherent light. The coherence of the light makes it possible to produce the three-dimensional light pattern in space.

According to a further aspect of the invention, the recording of reference light patterns and the use of these reference light patterns are carried out on different machines. Furthermore, it is also possible that a machine is the reference for its later performance. Another aspect of the invention is that to find and calibrate the translation and rotation of computer controlled machine, the present invention associates differently configured recordings of light patterns with encoder position readings.

ADVANTAGES

Figure 1:
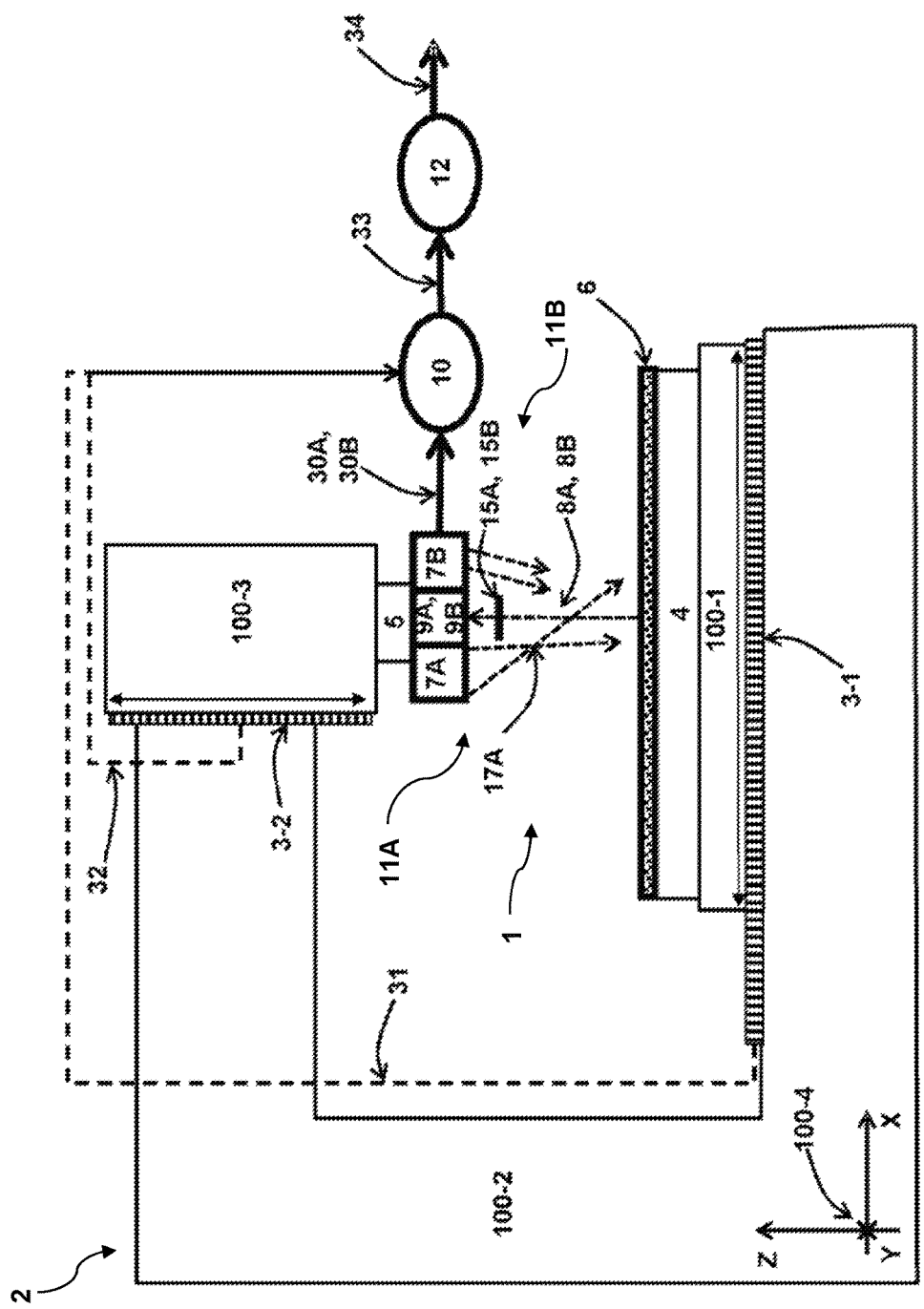
FIG. 1 is a schematic side view drawing illustrating a first exemplary embodiment of a milling machine equipped with a system comprising a sensor device according to the present invention.

The method of this invention enables quick and accurate sampling of data associated with the translation and rotation of a first machine part relative to the translation and rotation of a second machine part. Thus, the method enables dense sampling of translation and rotation offsets in a computer-controlled machine, such as a machine tool or a coordinate measuring machine, relative those of a reference machine. The comparison of data with the reference database, comprising interrelated image and position data associated with the spatial optical characteristics of the pattern generator, makes it possible to compare the position of image samples recorded in a first computer-controlled machine to image samples previously, or later, recorded in a reference computer-controlled machine, such as a coordinate-measuring machine or a calibration setup, using the same optical configurations. Thereby it is possible to quickly determine translation and rotation offsets at each sample position and to use the offset data to derive data for calibration of the first computer-controlled machine. The calibration data can be used to control movement of the first computer-controlled machine, such that its movement is corrected for by the movement of the reference machine used to record the reference data.

By associating exact positions and angles of optical configurations of cameras and illuminators with the position and angle of a physical part, herein referred to as the pattern generator, the present invention enables the exact tool holder translation and rotation in a computer controlled machine to be found by bringing the pattern generator, or a true sister replica of the pattern generator, from one machine (reference) to the other, and by observing the created light patterns with sensor devices defined by the same optical configurations. This creates a high degree of reliability and accuracy.

The pattern generator serves very much the same purpose as e.g. the encoder glass bar of a commercial encoder. As a consequence the present invention enables recording of translations and rotations of 3D light patterns in free space outside the pattern generator and uses this information to find the exact translation and rotation offset conditions of machine parts.

The sensor device enables quick and accurate sampling of data associated with the translation and rotation of the first machine part relative to the translation and rotation of the second machine part. Thus, the device enables dense sampling of translation and rotation offsets in a computer-controlled machine, such as a machine tool or a coordinate measuring machine. The provision of two different optical configurations makes it possible to derive reliable information of the translation of the first part relative to the translation of the second part separately from the rotation of the first part relative to the rotation of the second part. Also, since the effective distance of the first optical configuration is different from the effective distance of the second optical configuration, it is possible to record two clearly distinguished images of said three-dimensional light pattern that together contains sufficient translation and rotation information at each sample position. Thereby it is possible to quickly determine translation and rotation offsets at each sample position and to use the translation and rotation offset data to compensate for positioning in the first computer-controlled machine, such that the positioning in the first machine closely resembles the position ning in the reference machine used to record the reference data. Thus the sensor device more or less eliminates the effect of mechanical irregularities, bearing clearances, and/or mechanical play, all creating machine part positioning errors.

Recording carrier positions makes it possible to associate recorded image data to recorded carrier positions, and hence to associate positions referring to the coordinate system of a reference computer-controlled machine, such as a laboratory machine, to the positions referring to the coordinate system of another computer-controlled machine, i.e. the computer-controlled machine that is being used. This makes it possible to also produce exact translation and rotation data associated with the pattern generators and that together will work as advanced encoders.

This invention avails the use of a plurality of different optical configurations for each available camera, and thus makes it possible to use even a single camera. Also, a greater number of optical configurations enable translations and rotations from more degrees of freedom to be measured, and to obtain higher accuracy in determination of translation and rotation offsets.

DETAILED DESCRIPTION OF THE INVENTION

Example 1

Figure 2:
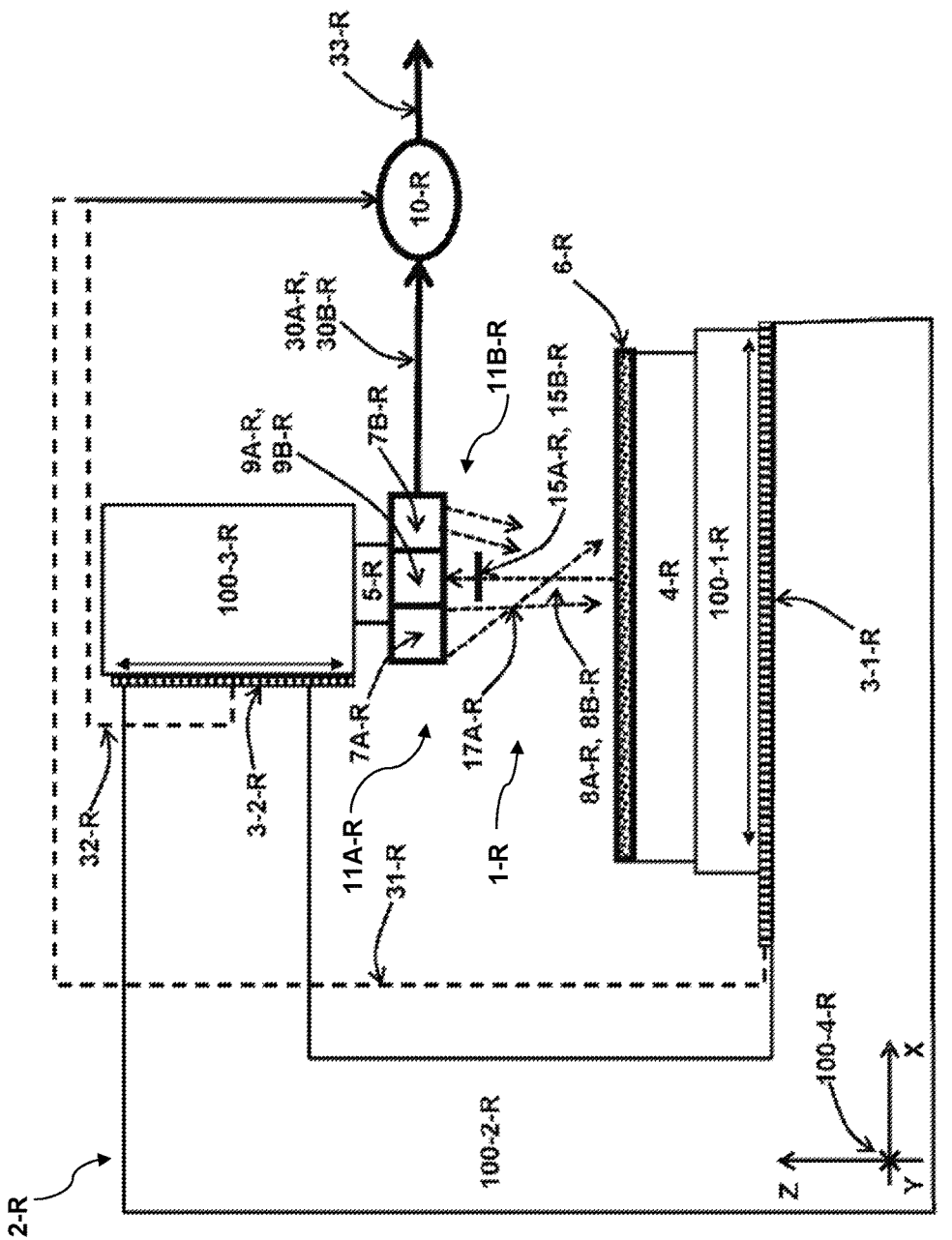
FIG. 2 is a schematic side view drawing illustrating a first exemplary embodiment of a coordinate measuring machine that is equipped with a system comprising a sensor device according to the present invention. This machine is collecting the reference data used by the milling machine, as represented by FIG. 1.

A sensor device 1 according to an embodiment of the invention will now be described with reference to FIG. 1. The sensor device 1 is in this example adapted for alignment and calibration of a milling machine 2. In FIG. 1, the milling machine 2 comprises the work area table 4, the tool holder 5, the support parts 100-1, 100-2, and 100-3, and the carriers 3-1 and 3-2. In the present example, when the carriers 3-1 and 3-2 of the milling machine 2 are mounted, their axes need to be aligned to become orthogonal to each other. Even after the carriers 3-1 and 3-2 have been mechanically adjusted, to align as best as possible with an internal coordinate system 100-4 of the milling machine 2, residual errors may still arise as the carriers move. These errors have to be taken into account if high machining precision is needed. The sensor device 1 is used to find these errors. The present embodiment represents these errors as translation and rotation offsets from corresponding reference data that are separately recorded by use of a CMM (Coordinate Measuring Machine) 2-R, as represented by FIG. 2. These errors are related to the positions of the moving parts of the milling machine 2. In the present example the milling machine has an internal 3D machine coordinate system 100-4 to which the X-, Y- and Z-carrier positions are referred (note that for simplicity only the X-carrier axis 3-1 and Z-carrier axis 3-2 is schematically shown in FIG. 1.) The purpose of the present embodiment is to find a set of translation and rotation offset data that is associated with a plurality of 3D positions within the milling machine working volume. These offset data are used by the machine builder to improve mounting and alignment, or by the machine CNC (Computer Numerical Control) to compensate for errors of the actual X-Y-Z carrier movements that are physically placing the tool into the intended positions in space.

FIG. 1 shows a schematic drawing of the milling machine 2 together with an embodiment of the present invention. The sensor device 1 comprises two illuminators 7A and 7B, and one or more cameras 9 (referenced in the figures as 9A, 9B, 9A-1, 9B-1, 9A-2, 9B-2, 9A-R, 9B-R). We discriminate between two optical configurations 11A and 11B. In a configuration when the illuminator 7A is made operational for illuminating the pattern generator 6, we shall say that the camera belongs to the optical configuration A, and call it camera 9A. Correspondingly, in a configuration when the illuminator 7B is made operational for illuminating the pattern generator 6, we shall say that the camera belongs to the optical configuration B and call it camera 9B. In this example the illuminators 7A, 7B, and the camera 9 are attached to the tool holder 5, and the pattern generator 6 is attached to the work piece holder 4. Note that another possible setup, that would work equally well, would be to attach the first and second illuminators 7A, 7B, and the camera 9, to the work piece holder 4, and attach the pattern generator 6 to the tool holder 5. The pattern generator 6 is a light scattering surface suitable for reflecting at least part of light emitted by the illuminator 7A, 7B in a direction towards the Camera 9. The illuminators 7A, 7B are configured to illuminate the pattern generator 6 for jointly creating 3-dimensional light patterns 8A, 8B in the space between the work piece holder 4 and the tool holder 5. The camera is configured to capture 2D (two-dimensional) pattern images of said three-dimensional light patterns 8A, 8B in space. The sensor device 1 is configured to capture images in at least a first 11A and a second 11B different optical configuration. The said first optical configuration 11A defines the path from said illuminator 7A, via said pattern generator 6, to said camera 9A. The said second optical configuration 11B defines the path from said illuminator 7B, via said pattern generator 6, to said camera 9B. Each respective optical configuration is hence defined by the relative position of the pattern generator 6, camera 9 and illuminators 7A, 7B. Thus, images captured by the camera 9, in the different optical configurations identified by the indices A and B respectively, will be separately unique and directly related to the relative position of the pattern generator 6, the camera 9 and the respective illuminators 7A, 7B. In addition to the sensor device 1, the total system according to this specific embodiment, also comprises a computer hard disk 10 or similar data storage device for storing the interrelated carrier positions 31, 32 from the milling machine 2 and pattern images 30A, 30B from the camera 9A, 9B. The computer also contains a processor 12 that is configured to compare previously recorded carrier reference position data 31-R, 32-R with the carrier position data 31, 32 coming from the milling machine 2, and to compare separately captured and previously recorded reference pattern image data 30A-R, 30B-R with the captured pattern image data 30A, 30B coming from the camera 9. In FIG. 1 the collected data 33, received by processor 12 from the hard disk 10, are the set of corresponding previously recorded carrier reference position data 31-R, 32-R, the carrier position data 31, 32, the previously recorded reference pattern image data 30A-R, 30B-R, and the captured pattern images 30A, 30B. The previously recorded carrier reference position data 31-R, 32-R and the previously recorded reference pattern image data 30A-R, 30B-R have been previously recorded in the separate CMM, as represented by FIG. 2, stored on the hard disk 10-R, and transferred to the hard disk 10 of FIG. 1.

Figure 3:
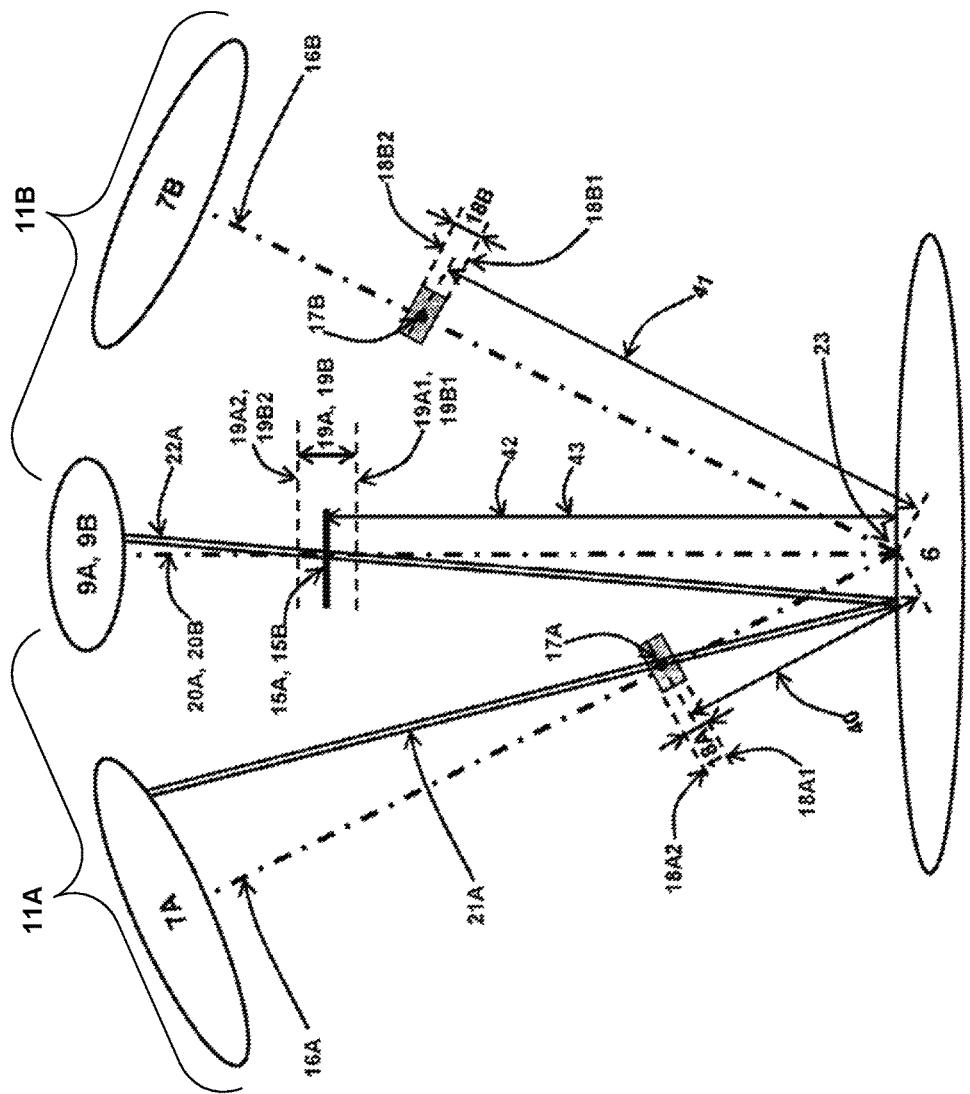
FIG. 3 is a schematic side view drawing representing optical paths and effective distances of the milling machine of FIG. 1 and the coordinate measuring machine of FIG. 2.

The illuminators 7A, 7B are of a type that is capable of emitting light suitable for illuminating the pattern generator 6 to create said 3D light patterns 8A, 8B in space. Typically, illuminators capable of emitting substantially coherent light are suitable for the stated purpose. For the purpose of the present invention, we define the coherence length of an illuminator 7 as the maximum optical path length difference that creates a degree of coherence larger than 50% of full coherence. In this specific embodiment, the illuminators are laser emitting diodes with a coherence length larger than the maximum path length differences within each of the optical configurations A and B. Light emitted from each of the illuminators 7A, 7B follows infinitely many different paths. For the optical configuration A, two examples of the paths are shown in FIG. 3, for illustration purposes. The first path is indicated by the dot-dash line that coincides with a first illuminator optical axis 16A going from the first illuminator 7A to the pattern generator 6, and is continued along the dot-dash line that coincides with a camera optical axis 20A going from the pattern generator 6 to the camera 9A. The second path is indicated by the fully drawn double line 21A going from the first illuminator 7A to the pattern generator 6, and is continued along the fully drawn double line 22A going from the pattern generator to the camera 9A. By considering all possible optical paths and path lengths from the first illuminator 7A, via the pattern generator 6, to the camera 9A, the laser diode source of the illuminator 7A should emit light of a coherence length that is larger than the maximum difference in length between these optical paths. The same coherence condition should separately also be met by the B configuration that involves the second illuminator 7B, pattern generator 6, and the camera 9B. The camera 9 is typically a 2D video camera of type CCD (Charge Coupled Device) or CMOS having preferably a resolution of 1000× 1000 pixels or better. The pattern generator 6 is suitably provided by a plane/flat stainless steel plate. Other materials, such as aluminium and glass, could be used within the scope of the invention to provide the pattern generator 6, as long as the reflection surface of the pattern generator 6 is suitable for creating the intended 3D light patterns 8A,8B in space. The pattern generator 6 could also be provided by a reflection hologram, or by a metal surface pattern evaporated onto a glass plate surface, or by an embossed imprint from a master surface on to another suitable surface. However, a key requirement is that the surface details should not change with time, such as for example due to corrosion, handling, or similar. In the present embodiment, the reflection surface of the steel plate has a surface roughness that is comparable to the laser light wavelength emitted by the illuminators 7A, 7B, thereby creating sufficient angular range of scattering angles and sufficient amount of light to be detected by the camera 9. In this embodiment, a computer contains the hard disk 10 and the processor 12. To receive the carrier position data 31, 32, the computer is connected to the milling machine, CNC, through an Ethernet cable, and the computer receives pattern images 30A, 30B from the camera 9 through the use of a USB port cable connection or a FireWire port cable connection. The reference position data 31-R, 32-R, and reference pattern images 30A-R, 30B-R are transferred from the reference hard disk 10-R to the hard disk 10 by use of a USB type memory stick or similar portable data storage device.

In the following a method according to an embodiment of the invention will be described with reference to FIGS. 1, 2, 3, and 4. The sensor device 1, described above, or a sensor device 1-R containing the same optical configurations is used to record the reference data stored in the hard disk 10-R, the storage means 10-R of FIG. 2. In order to record reference pattern images 30A-R, 30B-R and reference carrier position data 31-R, 32-R in the present embodiment we shall rely on a calibrated Coordinate Measuring Machine, hereinafter referred to as the CMM 2-R. Schematically this CMM 2-R is similar to the milling machine 2, but represented by FIG. 2. This CMM is programmed to move stepwise between sampling/recording positions in a fixed 3D matrix of positions. The number of positions would strongly depend on the user and its application. If the milling machine 2 should only be checked for assembly quality 5×5×5 positions may be sufficient. Otherwise, if detailed feedback correction data to the CNC are needed a high number such as 1000×1000×1000 might be needed. In the present example these positions cover a volume of 400× 400×400 mm. For each of these positions the computer hard disk 10-R stores two images, one for each optical configuration 11A-R, 11B-R, together with the corresponding carriers position data 31-RA, 32-RA, 31-RB, and 32-RB. Assuming the CMM is mechanically stable during image recordings the position 31-RA is equal to the position 31-RB, and the carrier position 32-RA is equal to the carrier position 32-RB. These data are the reference data for the subsequent milling machine 2 production/service alignment activities, and will in due time be transferred from the hard disk 10-R (FIG. 2) to the hard disk 10 (FIG. 1). The first and second illuminators 7A-R, 7B-R is laser diodes of the same type and coherence characteristics to later be used in the milling machine 2. In the present embodiment, and as schematically indicated in FIG. 2, and also corresponding to the configuration of the milling machine in FIG. 1, the first illuminator 7A-R has its focus position located between the first illuminator 7A-R and the pattern generator 6-R. The laser light diverges from this focus position 17A-R towards the pattern generator 6-R. The second illuminator 7B-R, as also schematically indicated in FIG. 1, contains optics to create collimated light that propagates towards the pattern generator 6-R. I.e. its divergence center is in this example set at infinity and consequently cannot be shown within the extend of the FIG. 2 drawing. FIG. 3 schematically shows the illumination/observation geometries of the two optical configurations A and B and represents the optical configurations both used on the milling machine 2, schematically represented by the FIG. 1 drawing, and the CMM 2-R, schematically represented by the FIG. 2 drawing. For clarity both divergence centers are shown within the extents of FIG. 3, although in the present embodiment the divergence center 17B of the second illuminator 7B is set to infinity. As also illustrated in FIG. 3 the camera imaging characteristics are defined by an object plane position and size 15A, 15B, and a corresponding depth of field 19A, 19B centered on this object plane. The depth of field extends from the planes 19A1,19B1 to the planes 19A2,19B2 respectively. In the present example the object plane is located in between the camera 9 and the pattern generator 6. Each of the camera optical axes 20A, 20B is defined to go through two points in space, the first point is the entrance pupil center of the camera 9A, 9B and the second point is their respective object plane 15A,15B centers. These camera optical axes 20A, 20B extend to define a point 23 where the camera 9 optical axis 20A, 20B meets the pattern generator 6. As also illustrated in FIG. 3 the illuminators optical characteristics are defined by divergence centers 17A, 17B, and a corresponding depth of field 18A, 18B centered on these respective divergence centers. The depth of field of illuminator 7A extends from the plane 18A1 to the plane 18A2. Correspondingly the depth of field of the illuminator 7B extends from the plane 18B1 to the plane 18B2. For clarity in the present example the divergence centers are located in between the respective illuminators 7A, 7B and the pattern generator 6. Each of the illuminators optical axes 16A, 16B is defined to go through two points in space, their respective divergence centers 17A, 17B to the point 23 where the respective camera optical axis 20A, 20B meets the pattern generator 6. The illuminator's divergence center distances diA 40, diB 41 are measured along their respective optical axis 16A, 16B from the divergence centers 17A, 17B to the reflection surface point 23 on the pattern generator 6. The camera object plane distances dcA 42, dcB 43 are measured along their respective optical axis 20A, 20B from the reflection surface point 23 on the pattern generator 6 to the object planes 15A, 15B. Note that these geometries change during the CMM 2-R reference recording and milling machine 2 measurements as the CMM carriers 3-1-R, 3-2-R, and milling machine carriers 3-1, 3-2 move. The defined axis, positions, and distances will change during those processes. The effective distance of the first optical configuration A is given by the equation deA=diA*dcA/(diA+dcA), and in the same way the effective distance of the second optical configuration B is given by the equation deB=diB*dcB/(diB+dcB). If the pattern generator 6 is curved, or contains a lens effect in transmission, diA and diB in the above equations should be replaced by the respective equations diA*f/(diA+f) and diB*f/(diB+f), where f represents the equivalent focal length of an equivalent pattern generator where the surface of the pattern generator 6 is replaced by an optically smooth surface without roughness. If for example the pattern generator 6 is curved with a signed radius of curvature of R the focal length f would be equal to R/2. For each of these optical configurations the depth of field defines a range within which an object is considered to be in focus. These ranges extend in the present example from the respective field planes 19A1, 19B1 to the field planes 19A2, 19B2, making the object plane distance dcA 42, dcB 43 range from respectively dcA1=dcB1 to dcA2=dcB2. Correspondingly the illuminators may cover different distances ranging from the respective divergence plane 18A1 to 18A2, and from 18B1 to 18B2, making the divergence center distances diA 40, diB 41 range from respectively diA1 to diA2, and diB1 to diB2. Inserted for dcA1, diA1, dcA2, and diA2 into the equation for the first effective distance deA, we get a range of effective distances that extend from deA1 to deA2. Correspondingly, if we insert for dcB1, diB1, dcB2, and diB2 into the equation for the second effective distance deB, we get a range of effective distances that extend from deB1 to deB2. Typically the depth of field for the cameras and illuminators involved is $+/-(2*\lambda*F*F)$, where lambda is the optical wavelength, and F is the effective optical F-number, referring to the pattern generator 6 side. By the effective F-number we mean the F-numbers that define the angular extend of the illuminators exit pupils and the camera entrance pupils through the equation $F=1/[2*\sin(v/2)]$, where v is the angular extent of those pupils as observed from the divergence centers and object planes. Note however, that the illuminators and camera may be configured with different F-numbers. Also note that in alternative optical configurations the illuminators 7A, 7B may contain astigmatic foci so that the divergence centers 17A, 17B are at different illumination distance diA (40 in FIG. 3) and diB (41 in FIG. 3) when observed in one transversal direction, say parallel to the X-axis, to the corresponding divergence center distances when observed in the orthogonal transversal directions. In other alternative optical configurations the same is the case with the camera imaging properties making the object plane position 15A and 15B be placed at different camera object plane distance dcA (42 in FIG. 3) and dcB (43 in FIG. 3) when focused on features in two orthogonal transversal directions. Astigmatic performance is typically obtained by including cylindrical optics in the illumination and/or observation paths. The optical configurations A, B are configured such that their effective distances do not overlap, i.e. for each sensor device 1 location any effective distances ranging from deA1 to deA2 should not be equal to any effective distances ranging from deB1 to deB2. If alternative optical configurations contain astigmatic divergence centers 17A, 17B, or astigmatic object plane positions 15A, 15B, the requirement is that the effective distance for the optical configurations A, B should not overlap for each of the transversal directions evaluated separately. For better image analysis performance the range of effective distances should be separated. Increasing the distance between the effective distances makes it easier to discriminate between the translation and rotation offsets, wherein influence from measurement errors thus is reduced.

Since the pattern generator 6 is illuminated by laser light a structurally stable light pattern 8 in the 3D space above the pattern generator 6 is created. This light pattern 8 is observed by means of the camera 9. Each of the optical configurations A and B creates a light pattern different from the other one. Typically these light patterns are unique for all the different recording positions. If the carriers 3-1, 3-2, and 3-1-R, 3-2-R, are controlled to record at a first recording position at a first time T1, then moved to record at subsequent recording positions, and finally moved back to record exactly at the first position at a second time T2, the pattern images recorded at time T1 will be exactly reproduced at time T2. But even very small positional offsets between the first and second time of recording, such as 0.1 μm, may affect the pattern image positions and are hence detectable.

After the CMM reference recordings are completed, using the sensor device 1-R according to the present embodiment, or a similarly optically configured sensor device 1, the collected reference data 33-R, recorded on the hard disk 10-R, is used to quantify misalignments while assembling, using, or servicing the milling machine 2. Once quantified, the misalignments are used to improve machine alignment and/or control subsequent CNC movements of the milling machine 2. This achieves better positioning regardless of any mechanical translational and rotational irregularities in the milling machine 2, not possible to be corrected for using customary calibration and alignment methods. The sensor device 1, containing the same optical configurations A, B as used to record the CMM 2-R reference data, is used. FIG. 1 shows a schematic illustration of the milling machine 2. In the present embodiment the pattern generator 6-R is moved to the milling machine and called the pattern generator 6. But the present embodiment would work equally well if both the pattern generator 6-R and the pattern generator 6 are exact replicas of the same master. The new positions of the illumination-camera assembly 7A, 9, 7B relative to the pattern generator 6 should closely reproduce those of the CMM machine. In order to make that happen the illuminator-camera assembly 7A, 9, 7B and the pattern generator 6 need to be pre aligned. For that purpose the use of pre positioned mechanical locators or an iterative mechanical alignment of the pattern generator 6 position is to be carried out. The milling machine 2 CNC-control is then used to move the illuminator-camera assembly 7A, 9, 7B into the neighborhoods of one of the previously CMM 2-R recorded positions relative to the pattern generator 6, then optically observe/measure the offsets, then mechanically move the pattern generator 6, and then repeat the alignment process until the positions somewhat match. Alternatively it is possible to mechanically align the illuminator-camera assembly 7A, 9, 7B relative to the pattern generator 6 just by manual use of rulers/calipers or other alignment tools such as a touch probe or similar.

After pre-alignment this milling machine 2 setup is ready to find its exact alignment, as measured relative to the CMM 2-R reference recordings. The collected reference data 33-R, represented by the series of corresponding reference carrier position data 31-R, 32-R and reference pattern image data 30A-R, 30B-R, are copied to the hard disk 10. The milling machine 2 is then instructed to nominally step between the previous nominal positions, those that corresponds to those recorded by the reference CMM 2-R. For each of these positions the computer hard disk 10 receives from the camera 9 the two pattern images 30A, 30B and the corresponding carrier positions 31, 32, recorded in the condition of the two optical configurations A and B respectively. The translation and rotation of the illuminator-camera assembly 7A, 9, 7B relative to the translation and rotation of the pattern generator 6 should nominally be equal to the corresponding translation and rotation used during the CMM 2-R reference recordings. As a consequence, for all positions, the new pattern images 30A recorded in the milling machine 2, in the optical configuration A, will be similar to the corresponding CMM 2-R reference pattern images 30A-R recorded in the corresponding optical configuration A. The same will be the case for the corresponding B recordings. More specifically, the images are similar enough for them to be recognized as the same pattern, but with a certain offset and possible slight de-correlation. However, in reference to the camera 9 photosensitive surface, the images will generally be displaced with relatively small amounts. Referring to the photosensitive surface these 2D image translation offsets we call (DAX, DAY) and (DBX, DBY) respectively. To calculate these offsets each reference pattern image 30A-R, 30B-R is mathematically 2 D cross-correlated with the corresponding milling machine 2 pattern images 30A, 30B (for cross-correlation calculations see e.g. the book by Athanasios Papoulis called Systems and Transforms with Applications in Optics, 1968, McGraw-Hill Book Company, New York).

For each of the carrier positions 31, 32 the positions of maximum cross-correlation determine the image offset (DAX, DAY) and (DBX, DBY) of the two optical configurations A and B. Since the encoders of the reference CMM 2-R carriers 3-1-R, 3-2-R may return slightly different carrier positions 31-R, 32-R from the instructed carrier positions 31, 32 of the machine 2 carriers 3-1, 3-2, even for the same nominal carrier positions, the carrier positions or the measured image translation offset should be corrected for by these possible differences. In the present example we apply these corrections on the image translation offset and call the corresponding corrected image translation offset for (dAx, dAy) and (dBx, dBy). These corrected image translation offsets are caused by a combination of translation offsets (Dx, Dy) and rotation angle offsets (Tx, Ty) of the illuminator-camera assembly 7A, 9, 7B relative to the pattern generator 6. I.e. the corrected image translation offsets are caused by the translation offsets (Dx, Dy) and rotation angle offsets (Tx, Ty) of the milling machine 2 work piece holder 4 relative to the tool holder 5, using the CMM 2-R first part 4-R relative to the second part 5-R positions as references. Dx and Dy represent translation offsets in the x- and y-directions respectively, whereas Tx and Ty represent rotation angle offsets around the x- and y-axis. These offsets refer to the milling machine coordinate axis 100-4 of FIG. 1. The reference carrier positions 31-R, 32-R refer to the CMM 2-R coordinate axis 100-4-R.

In a linear approximation the relation between the image translation offsets (dAx, dAy) and (dBx, dBy) and the relative part translation offsets (Dx, Dy) and rotation angle offsets (Tx, Ty) is expressed by the four equations dAx=m11*Dx+m12*Dy+m13*Tx+m14*Ty, dAy=m21*Dx+m22*Dy+m23*Tx+m24*Ty, dBx=m31*Dx+m32*Dy+m33*Tx+m34*Ty, dBy=m41*Dx+m42*Dy+m43*Tx+m44*Ty. In these equations the respective factors (m11, m12, m13, m14, m21, m22, m23, m24, m31, m32, m33, m34, m41, m42, m43, m44) are given by the exact illumination-observation geometries of the first and second optical configurations A, B respectively. As long as the effective distance deA, for creating the pattern images 30A, 30A-R of the optical configuration A, differs from the effective distance deB, for creating the pattern images 30B, 30B-R of optical configuration B, then the above equations is inverted to find the the work piece holder 4 translation and rotation angle offsets relative to the tool holder 5, as expressed by the translation offsets (Dx, Dy) and rotation angle offsets (Tx, Ty) values. As a numerical example we shall assume that illumination distance diA 40 is equal to 60 mm, the camera distance dcA 42 is equal to 100 mm, the illumination distance diB 41 is at infinity, the camera distance dcB 43 is also equal to 100 mm, the coordinate axis XYZ are parallel to the corresponding XYZ coordinate axis 100-4 (FIG. 1) of the milling machine 2, and that the origo is placed at the point 23 (FIG. 3) where the camera 9 optical axis 20A, 20B meets the pattern generator 6. For numbers representing the distances see FIG. 3. We shall also assume that the illuminators optical axis 16A, 16B are coaxial with the camera optical axis 20A, 20B, that the camera magnification is equal to $-\frac{1}{3}$, and that the X- and Y-axis of the camera photosensitive surface are parallel to the corresponding machines X- and Y-axis, as indicated by the milling machine coordinate axis 100-4 (FIG. 1) and CMM coordinate axis 100-4-R (FIG. 2). In a linear approximation these configuration parameters would, for the factors (m11, m12, m13, m14, m21, m22, m23, m24, m31, m32, m33, m34, m41, m42, m43, m44), give the respective values (−0.8889, 0.0, 0.0 mm, −66.667 mm, 0, −0.8889, 66.6667 mm, 0.0 mm, −0.3333, 0.0, 0.0 mm, −66.6667 mm, 0.0, −0.3333, 66.6667 mm, 0.0 mm). We shall also assume that there are no corrections due to the difference between the corresponding carrier positions 31, 32, and reference carrier positions 31-R, 32-R. Then the corrected image translation offsets (dAx, dAy, dBx, dBy) are found to be equal (−59.6, −4.0, −30.7, +2.7) μm respectively. Then these expressions can be inverted to give the searched values for the respective translation offsets (Dx, Dy) as (52.0, 12.0) μm and rotation angle offsets (Tx, Ty) as (100, 200) μRadians. The linear expressions, described above, describe the optical illumination, diffraction, and observation processes. In real applications the m-factors, described above, may have to take added non-linear deviations into account. Alternatively, the full non-linear equations are iterated to find the exact solution.

The translation and rotation data 34 represented by the carrier positions 31, 32, the associated part translation offsets (Dx, Dy), and associated rotation angle offsets (Tx, Ty), become the calibration data for subsequent milling machine production, service, or alignment activities. Alternatively the CNC of the milling machine 2 use these data for compensating the combined carrier 3-1, 3-2 error movements during milling.

Figure 4:
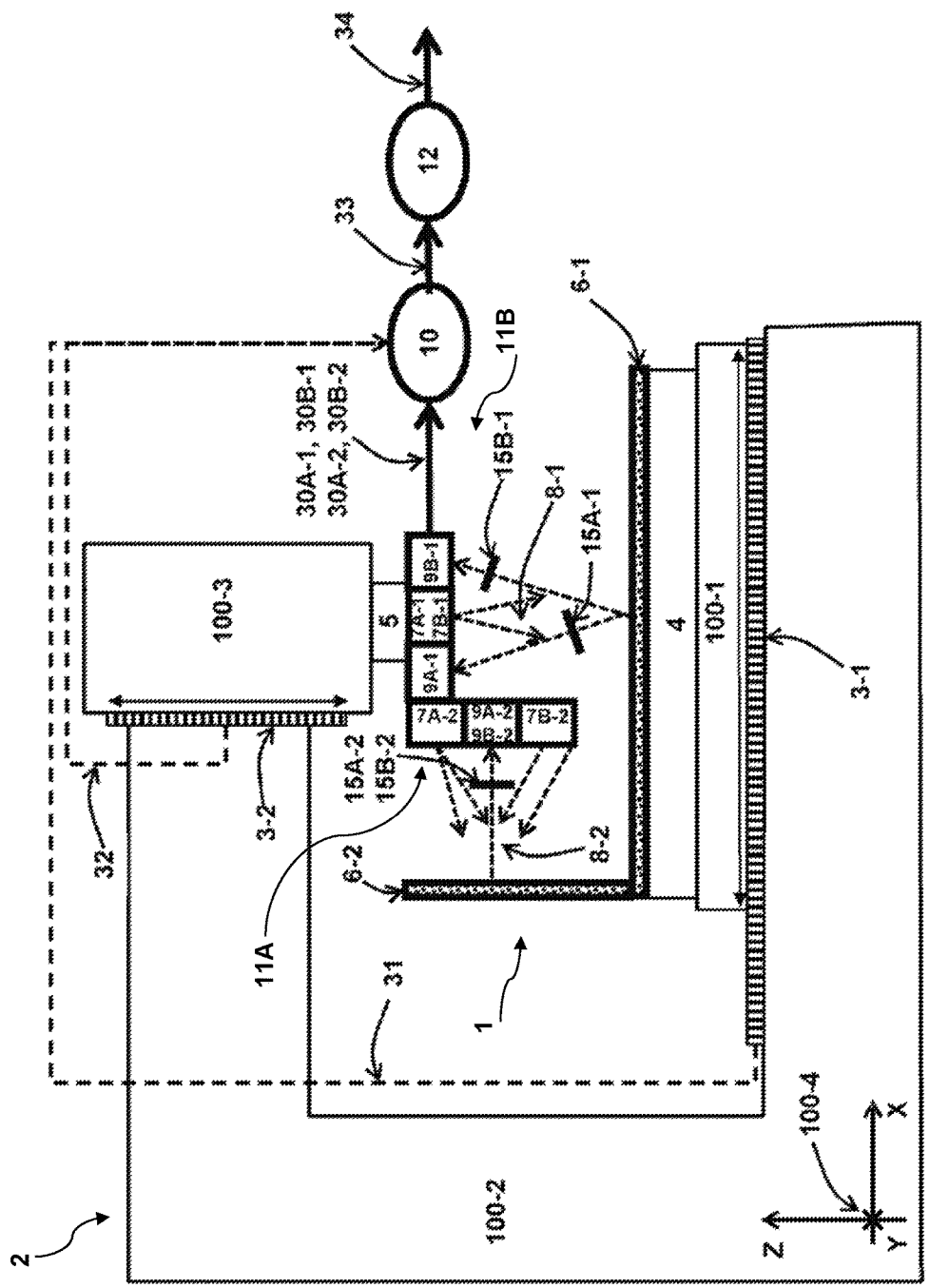
FIG. 4 is a schematic side view drawing of the milling machine of example 1, but equipped with an alternative system comprising sensor devices according to the present invention. The use of these sensor devices enables all 6 degrees of freedom (3 translations+3 rotations) of a rigid body movement at a plurality of positions to be found for the milling machine in reference to a coordinate measuring machine with similarly configured sensor devices.
Figure 5:
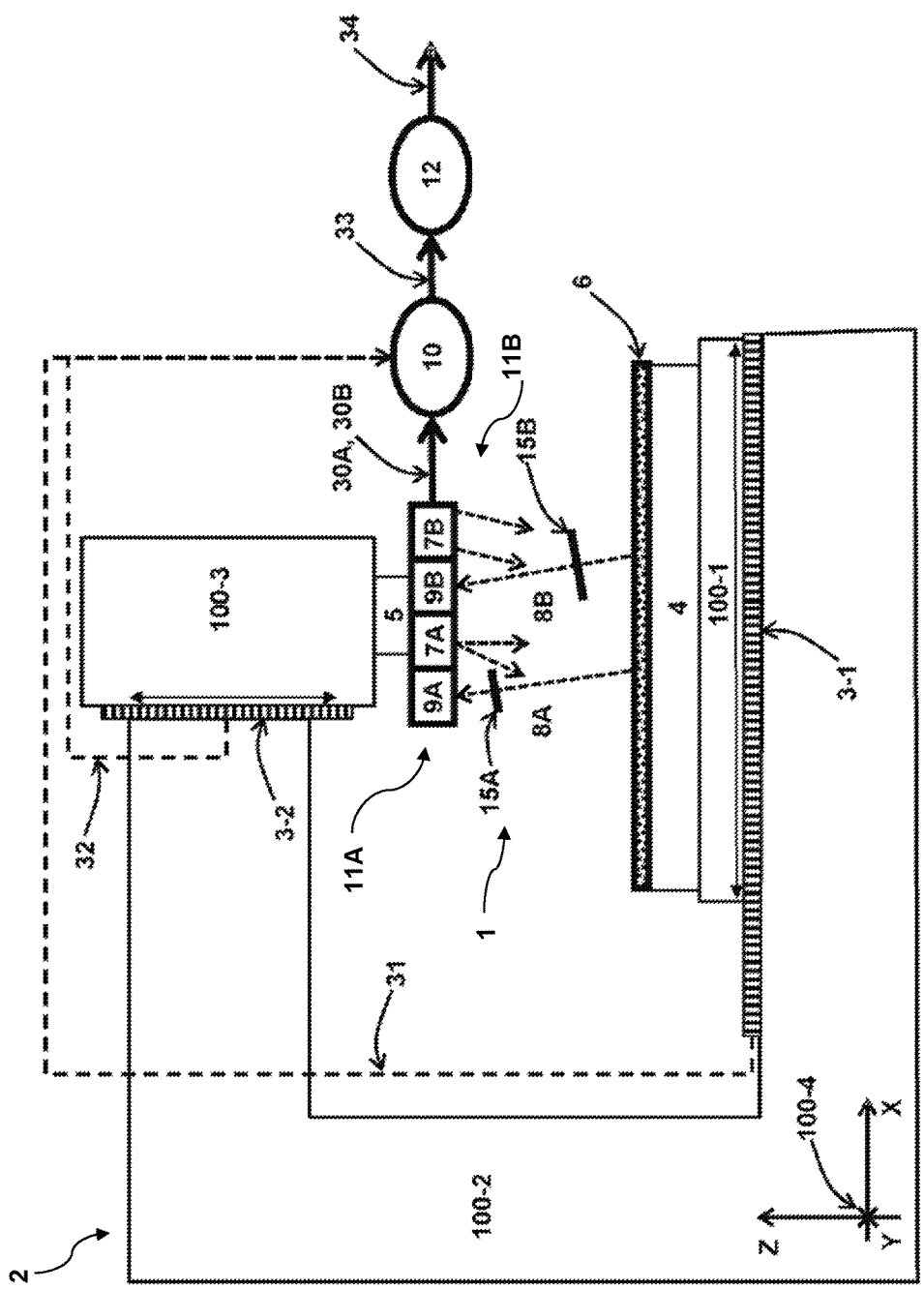
FIG. 5 is a schematic side view drawing of the milling machine of example 1, but equipped with an alternative system comprising sensor devices according to the present invention. The use of these sensors makes it practical to split the mechanical construction of the sensor device into two illuminator-camera houses that also can be operated separately.

In general two optical configurations A, B are necessary to simultaneously find separately the translation and rotation components. But although two different optical configurations are provided in this embodiment, a higher number of optical configurations could be provided in other embodiments. A higher number of optical configurations gives more information and provides for a higher number of spatial references, but also requires a larger computational capacity for analysis of data recorded. The exact setup of the optical configurations is varied within the scope of the invention, as long as the light pattern is repeatable, such that it is reproduced over and over again in. An example is schematically shown in FIG. 4 that enables all 6 degrees of freedom (3 translations+3 rotations) of a rigid body movement to be found for all carrier positions 31, 32 applied. Also, according to the embodiment to provide two different optical configurations A and B, two separate cameras 9A-1, 9B-1 is used in combination with one illuminator 7. See the separate cameras 9A-1, 9B-1 that are optically configured together with one illuminator 7 called 7A-1 and 7B-1 in FIG. 4. Yet in another example, according to an embodiment, two separate illuminators are used in combination with two cameras to provide two different optical configurations A and B. See an example in FIG. 5 where the illuminator 7A, pattern generator 6, and camera 9A belongs to the A configuration and the illuminator 7A, pattern generator 6, and camera 9A belongs to the B configuration. In that case they might be grouped as two different sensor heads having one illuminator and camera each. If more than one illuminator is used in combination with the same camera, the illuminators are preferably operated to alternately illuminate the pattern generator 6, such that a plurality of different optical light patterns are created based on the origin of light emitted and, if more than one illuminator emits light concurrently, also based on the interference of light waves emitted. In other embodiments, at least one illuminator is attached to a part 4, non-movably relative to the pattern generator 6 that is also attached to the part 4, wherein the cameras are attached to another machine part 5 such that they are movable relative to the pattern generator 6 and the illuminator. In further embodiments, a plurality of pattern generators is provided and combined with various optical configurations A, B of camera(s) and illuminator(s). In other embodiments, since the positioning of most CNC controlled machines are very repeatable it might also be possible to collect all pattern images 30A of the optical configuration A first, and then collect all pattern images 30B of the optical configuration B. In that case the repeatability error of the computer controlled machine would add to the final result. However, the flexibility in recording with one optical configuration at a time might out weight that disadvantage.

Instead of using the CMM of this example as a reference machine other alternatives is to either use a laboratory machine as the reference, or the best machine in a production series as a reference, or record the initial state of a machine for later reference during subsequent service(s).

Since the characteristics of low cost pattern generators 6 depend on the production process, such as a milling or electrical erosion process, the surface structure details of the pattern is random but unique for each pattern generator. However, it is possible, for example by use of holographic replicating techniques, to replicate the optical characteristics of a pattern generator making it possible to mass produce sufficiently identical pattern generators. It is also possible to create a mask, using a photographic technique or a stamping method, which can make several identical replica of the master. These masks may either work in reflection of transmission.

Example 2

Figure 6:
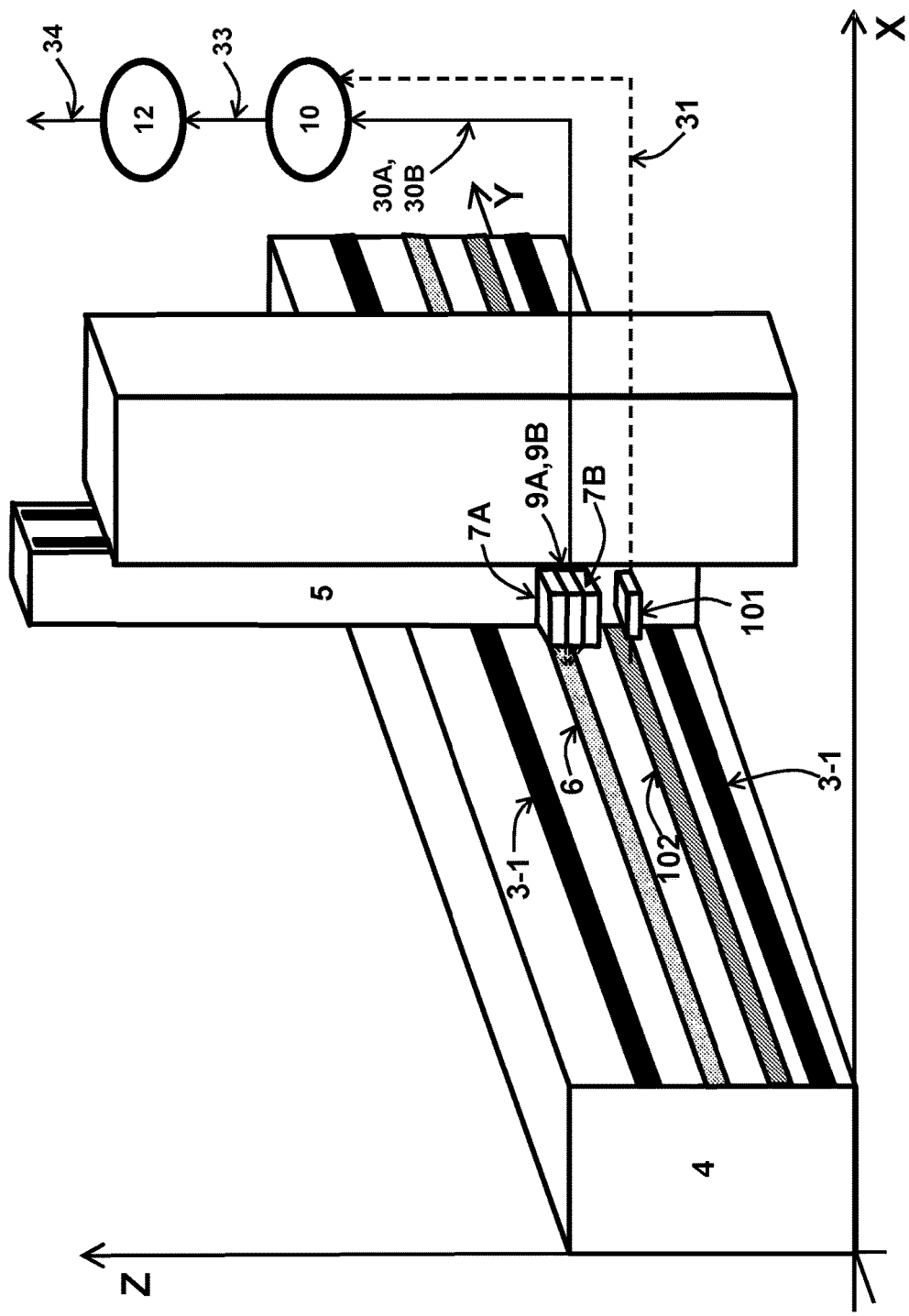
FIG. 6 is a schematic projection view drawing illustrating a second exemplary embodiment of the carrier details of a computer numerically controlled machine that is equipped with a system comprising a sensor device according to the present invention. This solution enables the system work as an advanced translation and rotation encoder.
Figure 7:
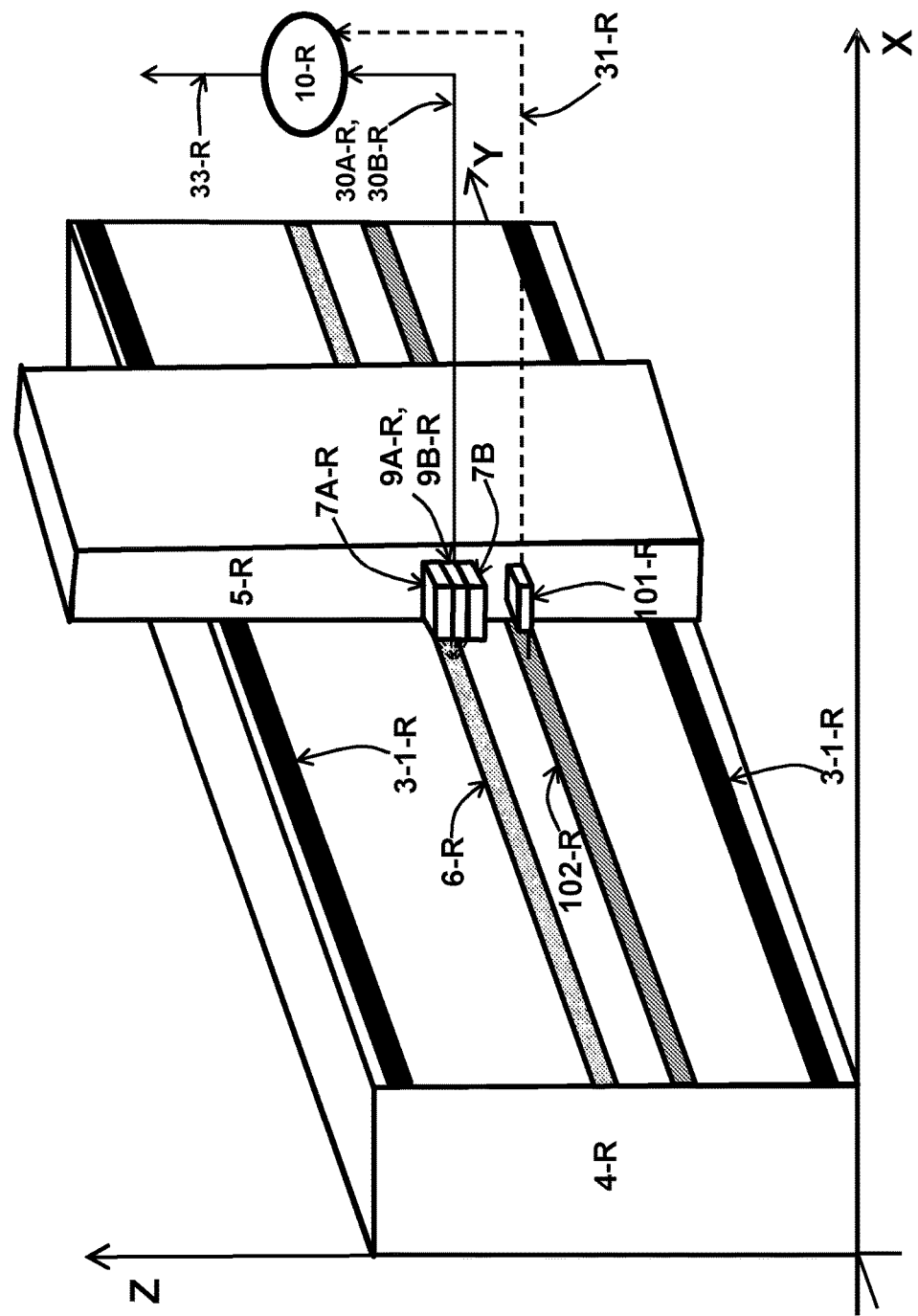
FIG. 7 is a schematic projection view drawing illustrating the second exemplary embodiment of the carrier details of a calibration reference machine that is equipped with a system comprising a sensor device according to the present invention. This machine is collecting the reference data used by the computer numerically controlled machine, as represented by FIG. 6.
Figure 8:
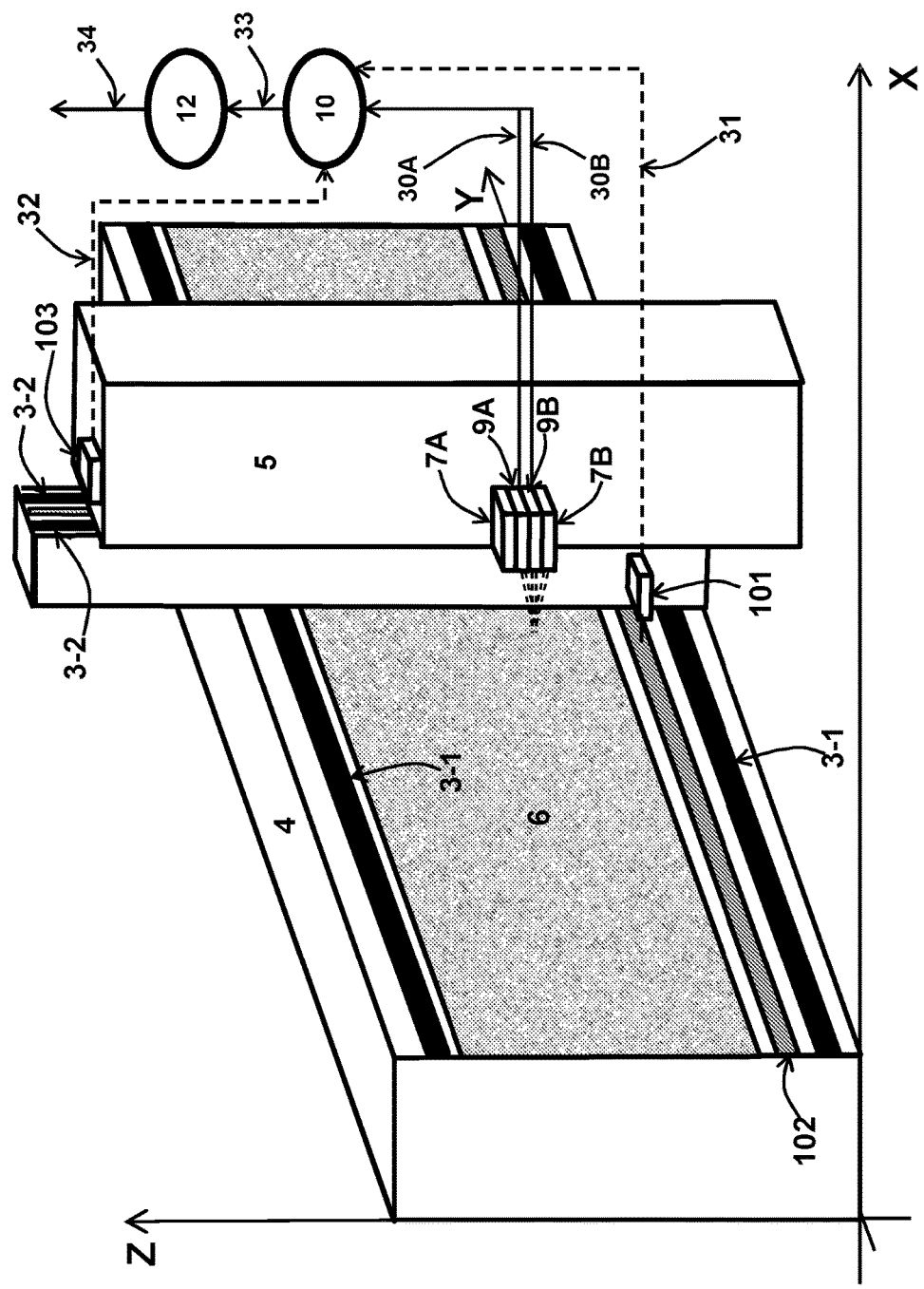
FIG. 8 is a schematic projection view drawing illustrating an alternative second exemplary embodiment of the carrier details of a computer numerically controlled machine that is equipped with a system comprising a sensor device according to the present invention. This solution enables the system work as an advanced translation and rotation encoder representing the exact positioning of two independent carriers.

This embodiment works as an absolute position encoder that is able to calibrate for translation and rotation offsets. In the present context an absolute encoder is an encoder that is reading and knows the carrier positions without necessarily having to keep track of its positions relative to a starting (home) position. Variations of this embodiment are illustrated in FIGS. 6, 7, and 8. FIG. 6 schematically shows some of the parts of an advanced one-carrier encoder. In this figure the pattern generator 6 is fastened to a machine part 4 and the illuminators 7A, 7B and camera 9 to the machine part 5, where the camera 9A is the same as camera 9B but belonging to the different optical configurations A and B respectively. To obtain high sampling rate the camera 9 is a 2D video camera of type CMOS having a resolution of only 50×50 pixels, but with a sampling rate of 10000 per second. The carrier 3-1 with two parallel carrier slides, see FIG. 6, enables the machine to move part 5 relative to part 4 in the direction parallel to the Y-axis. A traditional encoder sensor head 101, reading the carrier Y-position 31, is also indicated. For each carrier position 31 this embodiment is able to find the part 5 translation (Dy, Dz) and rotation angles (Ty,Tz) offsets relative to the part 4. The translation and rotation data 34, represented by the carrier positions 31, the associated part translation offset (Dx, Dy), and associated rotation angle offset (Tx, Ty) become the encoder data to be used by the machine into which this advanced one-carrier encoder is installed.

In the present embodiment a carefully prepared calibration reference machine, schematically shown in FIG. 7, is used to create the collected reference data 33-R. This calibration reference machine is optically configured as similar as possible to the advanced one-carrier encoder of FIG. 6, but to obtain high rotation offset accuracy its mechanics includes larger distances between the two precision carriers 3-1-R, and between the carriers 3-1-R and the moving part 5-R, both in the Z- and Y-directions. This calibration reference machine provides the collected reference data 33-R represented by the reference carrier position 31-R and reference pattern image data 30A-R, 30B-R, characterizing the exact translation and rotation of part 5-R relative to part 4-R. A small embedded computer contains the processor 12 (FIG. 6). The collected reference data 33-R is copied to a USB memory key. The USB memory key is placed into the embedded computer and copied to an internal memory 10 within this embedded computer. As indicated in FIG. 6 also the carrier position data 31 and the pattern image data 30A, 30B are copied to the internal memory 10. Through the same calculations, as described in Example 1, knowing the collected data 33, the corresponding reference carrier position 31-R and carrier positions 31, and corresponding reference pattern image data 30A-R, 30B-R and pattern image data 30A, 30B, all for each carrier 3-1 position, the processor 12 in real time calculates the part 5 (Dy, Dz) translation offset and (Ty,Tz) rotation angle offset relative to the part 4. In the present context real time means an update rate necessary for the CNC machine, into which this embodiment of a one-carrier encoder is installed, makes its CNC operate at a proper speed.

Alternatively, when only Y-translations and rotation angle offsets around the Z-axis is needed, this embodiment is, instead of the 2D camera, equipped with a 1D line camera with a resolution of 500 pixels, where the pixel line is parallel to the Y-axis and the sampling rate is 10000 per second. For each carrier position 31 this embodiment is then able to find the part 5 (Dy) translation offset and (Tz) rotation angle offset relative to the part 4 if the photo sensitive line surface of the line camera is parallel to the y-axis, or to find the part 5 (Dz) translation offset and (Ty) rotation offset relative to the part 4 if the photosensitive line surface of the line camera is parallel to the z-axis.

In the first case in a 1D line camera case a linear approximation to the relation between the image translation offsets (dAy) and (dBy) and the relative part translation offset (Dy) and rotation angle offset (Tz) is expressed by the two equations $dAy=m11*Dy+m12*Tz$, $dBy=m21*Dy+m42*Dy+m22*Tz$. In these equations the respective four factors (m11, m12, m21, m22) are given by the exact illumination-observation geometries of the first and second optical configurations A, B respectively.

FIG. 8 shows an alternative encoder we call an advanced two-carrier encoder that is installed inside a computer controlled machine with carriers 3-1, 3-2 moving the part 5 relative to part 4 in both the Y- and Z-directions. Also this embodiment is able to find the part 5 (Dy, Dz) translation offset and (Ty,Tz) rotation angle offset relative to the part 4. A further use of this embodiment is for installation into a machine tool like the milling machine 2, described in example 1. Then concurrent measurements of translations and rotations during machining, or concurrent measurement of the effect of tool load and speed, or concurrent measurement of thermal changes, is then carried out.

In the embodiments, described in the present example 2, the carrier position data 31 from the encoder sensor head 101 helps speed up the retrieval of the correct pattern image data 30A, 30B, since the reference carrier positions 31-R, and when applicable 32-R, helps select pointing at the matching pattern image data 30A, 30B. Although the reference encoder sensor head 101-R is needed for associating the reference pattern data 30A-R, 30B-R to the reference carrier positions such as 31-R and 31-R, all the devices according to present invention may work equally well without access to the carrier positions 31, 32. In that case the processor 12 needs to first search for pattern images 30A, 30B, that match the reference pattern images 30A-R, 30B-R, before the detailed image correlations, which finds the part translations and rotations, are carried out. However, in the embodiments of the present example 2 the speed of the encoders may be crucial, but the embodiments of example 1 will work nearly as accurate without the use of the carrier positions 31, or the carrier positions 31, 32. The reason why they do not work as accurate is due to the fact that in these cases the processor 12 does not have access to minor correction between CNC instructed and actually read carrier position 31, 32 (see the description of compensation of the corrected image translation offsets of example 1).

Example 3

Figure 9:
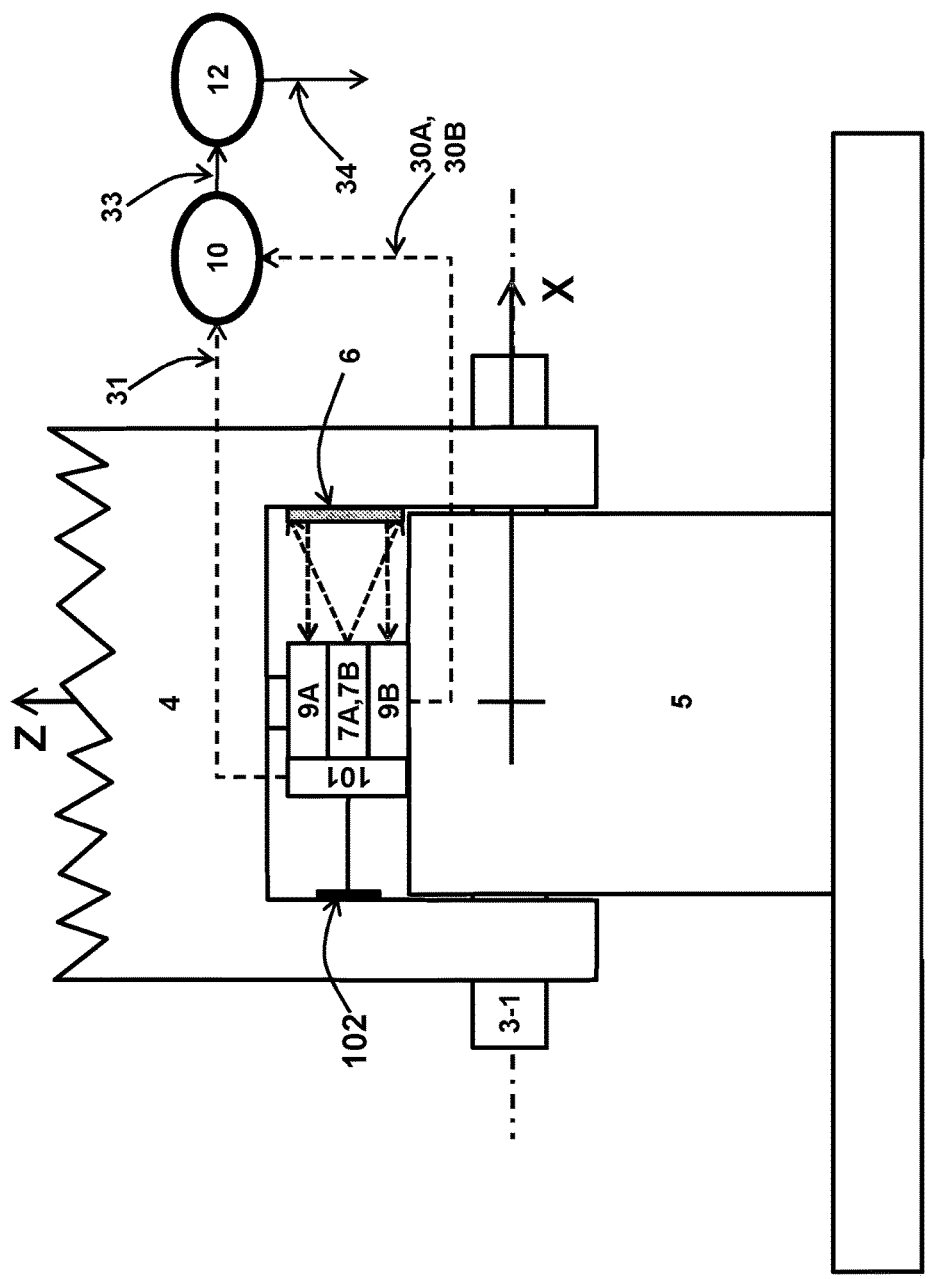
FIG. 9 is a schematic side view drawing illustrating a third exemplary embodiment of the carrier details of a robot joint that is equipped with a system comprising a sensor device according to the present invention. This solution enables the system work as an advanced translation and rotation encoder making it possible to find the exact translation and rotation of a robot arm tip.

This embodiment works as an absolute angle encoder of a robot joint. This encoder is able to calibrate for translation and rotation offsets. This is schematically illustrated in FIG. 9. FIG. 9 shows some of the mechanical parts of a robot joint and an embodiment of the present invention. In this figure the pattern generator 6 is fastened to a machine part 4, and the illuminator 7 and cameras 9A, 9B to the machine part 5. Here 7A indicates that the illuminator 7 belongs to the optical configuration A and 7B that it belongs to the optical configuration B. The pattern generator 6 is a plane and polished glass plate with a detailed mirror pattern evaporated on its surface. If the pattern is randomized all pattern images 30A, 30B will be different. If the pattern is periodic the patterns may repeat themselves at different carrier positions 31, and the processor 12 needs access to the carrier positions 31 to discriminate between patterns. This pattern generator 6 has been created from a drawing making it possible to create a plurality of optically identical copies. This makes it possible to make, from the drawing master, a different copy reference pattern 6-R that is used in a reference robot joint. However, the pattern needs to be detailed enough to diffract light from the illuminator 7A to the camera 9A and from the illuminator 7B to the camera 9B. The reference robot joint is not shown in a drawing but, except for the processor 12 and the translation and rotation data 34, could be represented by FIG. 9 where all the numbers and characters combinations ends with -R (see FIGS. 2 and 7 for the similar notation conventions). The carrier 3-1, the bearing shown in FIG. 9, enables the machine to rotate part 5 relative to part 4 around the X-axis.

A traditional angle encoder sensor head 101, reading the carrier rotation angle off a segmented glass line pattern 102 that also turns around the X-axis, is also indicated. For each rotation angle around the X-axis the embodiment of the present example is able to find the part 5 local (Dy, Dz) translation offset and (Ty,Tz) rotation angle offset relative to the part 4. Since both the translation offset (Dy, Dz) and the rotation angle offset (Ty,Tz) at the robot joint are found with a high accuracy, by extrapolation the translation and rotation of the robot arm tip is also found with a high accuracy.

The invention claimed is:

1. Method for acquiring the translation and rotation of a first part relative to the translation and rotation of a second part of a computer-controlled machine having at least one movable carrier for changing the position of the first machine part relative to that of the second machine part, the method comprising
providing a pattern generator attached to the first machine part,
providing a first illuminator attached to either the first machine part or the second machine part and being optically configured to illuminate the pattern generator for jointly creating a three-dimensional pattern of light in space,
providing a first camera attached to the second machine part and being optically configured to record pattern images of said three-dimensional pattern of light in space,
providing a second illuminator or a second camera,
providing a range of effective optical distances of a first optical configuration in which light is propagated along optical paths from one of said first or second illuminators via the pattern generator to one of said first or second cameras for capturing a first image of the three-dimensional pattern of light in space is not overlapping with a range of effective optical distances of a second optical configuration in which light is propagated along optical paths from one of said first or second illuminators via the pattern generator to one of said first or second cameras for capturing a second image of the three-dimensional pattern of light in space, configuring each of said first or second illuminators being configured to illuminate the pattern generator with light of a coherence length that is larger than a maximum optical path length difference within each of the optical configurations, and configuring the sensor device to capture either:
a) said first image of the three-dimensional pattern of light in space using a combination of said first illuminator and said first camera, and said second image of the three-dimensional pattern of light in space using a combination of said first illuminator and said second camera, or
b) said first image of the three-dimensional pattern of light in space using a combination of said first said first camera and said first illuminator, and said second image of the three-dimensional pattern of light in space using a combination of said first camera and said second illuminator, or
c) said first image of the three-dimensional pattern of light in space using a combination of said first illuminator and said first camera, and said second image of the three-dimensional pattern of light in space using a combination of said second illuminator and said second camera,
wherein at each position of the movable carrier the first and second said illuminator or the first and second camera are controlled to operate alternately so as to capture said first and second images non-concurrently and only in respective different optical configurations.

2. Method according to claim 1, further comprising moving the movable carrier to a plurality of positions, and at each position recording carrier position data related to the position of said movable carrier in conjunction with a configuration of said sensor device.

3. Method according to claim 1, wherein images are recorded at each position of the movable carrier using a plurality of said cameras configured to record images in respective different object planes.

4. Method of deriving data for calibration or improving the positioning of a computer-controlled machine comprising a movable carrier for changing the position of a first machine part relative that of second machine part, wherein the method comprises:
providing a sensor device for a computer-controlled machine having a movable carrier for changing the position of a first machine part relative to that of a second machine part, wherein the sensor device comprises:
a pattern generator attached to the first machine part;
a first coherent light illuminator attached to either the first machine part or the second machine part and being optically configured to illuminate the pattern generator with coherent light for jointly creating a three-dimensional pattern of light in space; and
a first camera attached to the second machine part and being optically configured to record pattern images of said three-dimensional pattern of light in space,
wherein the sensor device further comprises either:
a) a second camera and the sensor device is configured to capture a first image of the three-dimensional pattern of light in space, using a combination of said first coherent light illuminator and said first camera, and a second image of the three-dimensional pattern of light in space using a combination of said first coherent light illuminator and said second camera, wherein a range of effective optical distances of a first optical configuration in which light is propagated along optical paths from said first coherent light illuminator via the pattern generator to said first camera for capturing said first image is not overlapping with a range of effective optical distances of a second optical configuration in which light is propagated along optical paths from said first coherent light illuminator via the pattern generator to said second camera for capturing said second image, and said first coherent light illuminator being configured to illuminate the pattern generator with light of a coherence length that is larger than a maximum optical path length difference within each of the optical configurations; or
b) a second coherent light illuminator and a sensor device is configured to capture a first image of the three-dimensional pattern of light in space using a combination of said first camera and said first coherent light illuminator, and a second image of the three-dimensional pattern of light in space using a combination of said first camera and said second coherent light illuminator, wherein a range of effective optical distances of a first optical configuration in which light is propagated along optical paths from said first coherent light illuminator via the pattern generator to said first camera for capturing said first image is not overlapping with a range of effective optical distances of a second optical configuration in which light is propagated along optical paths from said second coherent light illuminator via the pattern generator to said camera for capturing said second image, and each of said first or second coherent light illuminators being configured to illuminate the pattern generator with coherent light of a coherence length that is larger than a maximum optical path length difference within each of the optical configurations; or
c) a second camera and a second coherent light illuminator and the sensor device is configured to capture a first image of the three-dimensional pattern of light in space using a combination of said first coherent light illuminator and said first camera, and a second image of the three-dimensional pattern of light in space using a combination of said second coherent light illuminator and said second camera, and wherein a range of effective optical distances of a first optical configuration in which light is propagated along optical paths from said first coherent light illuminator via the pattern generator to said first camera for capturing said first image is not overlapping with a range of effective optical distances of a second optical configuration in which light is propagated along optical paths from said second coherent light illuminator via the pattern generator to said second camera for capturing said second image, and each of said first and second coherent light illuminators being configured to illuminate the pattern generator with coherent light of a coherence length that is larger than a maximum optical path length difference within each of the optical configurations,
moving the movable carrier to a plurality of carrier positions such that the position of the first machine part relative to that of the second machine part changes for each of said plurality of positions,
and, at each carrier position, recording position data related to the position of said movable carrier and operating the sensor for recording a pair of first and second images of said the three-dimensional light pattern in space in respective ones of the first and second optical configurations, and comparing said recorded image data with image data of a reference database comprising interrelated image and position data related to the three-dimensional pattern of light in space of the pattern generator and finding pairs of similar images,
deriving image translation offset data for each pair of similar images, and
deriving translation and rotation data for calibration or improving the positioning of the computer-controlled machine based on image translation offset data related to the optical configurations.

* * * * *